(12) United States Patent
Chen et al.

(10) Patent No.: US 7,848,032 B1
(45) Date of Patent: Dec. 7, 2010

(54) IMAGING LENS ASSEMBLY

(75) Inventors: Chun Shan Chen, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/662,407

(22) Filed: Apr. 15, 2010

(30) Foreign Application Priority Data

Sep. 15, 2009 (TW) .............................. 98131021 A
Dec. 15, 2009 (TW) .............................. 98142852 A

(51) Int. Cl.
*G02B 13/18* (2006.01)
*G02B 9/34* (2006.01)

(52) U.S. Cl. ........................................ 359/715; 359/781
(58) Field of Classification Search ......... 359/713–715, 359/781
See application file for complete search history.

(56) References Cited

U.S. PATENT DOCUMENTS

| 7,277,238 | B2 | 10/2007 | Noda |
| 7,365,920 | B2 | 4/2008 | Noda |
| 7,375,903 | B2* | 5/2008 | Taniyama .................... 359/715 |
| 2010/0020417 | A1* | 1/2010 | Lin ............................. 359/715 |

* cited by examiner

*Primary Examiner*—Scott J Sugarman
(74) *Attorney, Agent, or Firm*—Bacon & Thomas, PLLC

(57) ABSTRACT

This invention provides an imaging lens assembly comprising, in order from an object side to an image side: a first lens element with negative refractive power having a convex object-side surface and a concave image-side surface; a second lens element with positive refractive power having a convex image-side surface; a third lens element with negative refractive power having a concave object-side surface and a convex image-side surface, both being aspheric; a fourth lens element with positive refractive power having a convex object-side surface, both its two surfaces being aspheric; and a stop disposed between the first and second lenses.

25 Claims, 21 Drawing Sheets

| TABLE 1 | | | | | |
|---|---|---|---|---|---|
| (Embodiment 1) | | | | | |
| f = 6.02 mm, Fno = 2.45, HFOV = 35.2 deg. | | | | | |
| Surface # | | Curvature Radius | Thickness | Material | Focal length |
| 0 | Object | Plano | Infinity | | |
| 1 | Lens 1 | 6.60720 (ASP) | 0.800 | Plastic | APEL-5514ML | -19.82 |
| 2 | | 3.92200 (ASP) | 0.472 | | |
| 3 | Ape. Stop | Plano | 0.371 | | |
| 4 | Lens 2 | -99.28750 (ASP) | 2.954 | Plastic | ARTON-D4532 | 6.53 |
| 5 | | -3.27560 (ASP) | 2.837 | | |
| 6 | Lens 3 | -1.17752 (ASP) | 1.064 | Plastic | PC | -17.23 |
| 7 | | -1.77787 (ASP) | 0.100 | | |
| 8 | Lens 4 | 3.58960 (ASP) | 3.000 | Plastic | ARTON-D4532 | 8.14 |
| 9 | | 18.25660 (ASP) | 1.000 | | |
| 10 | Filter | Plano | 0.300 | Glass | BSC7 | - |
| 11 | | Plano | 0.500 | | |
| 12 | Cover-glass | Plano | 0.550 | Glass | BSC7 | - |
| 13 | | Plano | 1.440 | | |
| 14 | Image | Plano | | | |
| P.S. The focal lengths(f) and refractive indexes(Index) are caculated based on a wavelength of 587.6nm. | | | | | |

Fig.11

| TABLE 2 | | | | |
|---|---|---|---|---|
| Aspheric Coefficients | | | | |
| Surface # | 1 | 2 | 4 | 5 |
| k = | 7.43650E+00 | 5.26144E+00 | -2.00000E+01 | -6.71142E-01 |
| A4 = | 8.85547E-03 | 1.17885E-02 | -3.18630E-03 | -6.78559E-03 |
| A6 = | -2.95292E-04 | -2.32228E-03 | 1.67121E-04 | 1.17876E-03 |
| A8 = | -1.78935E-05 | 9.96461E-04 | -2.81847E-04 | -7.74820E-04 |
| A10= | 1.22782E-05 | -4.80328E-04 | 1.15250E-04 | 2.10945E-04 |
| A12= | | | 2.43976E-05 | -3.10929E-05 |
| A14= | | | | 1.83353E-06 |
| Surface # | 6 | 7 | 8 | 9 |
| k = | -1.64060E+00 | -7.81681E-01 | -1.32141E+00 | -2.00000E+01 |
| A4 = | -1.70291E-02 | 8.90296E-03 | -7.56862E-03 | -5.03396E-03 |
| A6 = | 3.26166E-03 | 1.76546E-05 | 7.37811E-04 | 5.15171E-04 |
| A8 = | -1.14836E-04 | 9.28662E-05 | -4.87397E-05 | -3.34991E-05 |
| A10= | | -2.77803E-07 | 1.70570E-06 | 1.01187E-06 |
| A12= | | -5.25208E-07 | -2.95176E-08 | -1.35984E-08 |
| A14= | | 3.21295E-08 | | |

Fig.12

| TABLE 3 | | | | | |
|---|---|---|---|---|---|
| (Embodiment 2) | | | | | |
| f = 5.83 mm, Fno = 2.80, HFOV = 31.1 deg. | | | | | |
| Surface # | | Curvature Radius | Thickness | Material | Focal length |
| 0 | Object | Plano | Infinity | | |
| 1 | Lens 1 | 3.92120 (ASP) | 1.064 | Plastic | OKP4HT | -35.97 |
| 2 | | 2.99296 (ASP) | 0.192 | | |
| 3 | Ape. Stop | Plano | 0.205 | | |
| 4 | Lens 2 | 5.42330 (ASP) | 2.107 | Plastic | APEL-5514ML | 3.97 |
| 5 | | -3.10440 (ASP) | 1.024 | | |
| 6 | Lens 3 | -0.84675 (ASP) | 0.378 | Plastic | OKP4HT | -3.86 |
| 7 | | -1.52180 (ASP) | 1.003 | | |
| 8 | Lens 4 | 2.30207 (ASP) | 2.725 | Plastic | APEL-5514ML | 4.51 |
| 9 | | 21.97320 (ASP) | 0.500 | | |
| 10 | Filter | Plano | 0.300 | Glass | BSC7 | - |
| 11 | | Plano | 0.300 | | |
| 12 | Cover-glass | Plano | 0.550 | Glass | BSC7 | - |
| 13 | | Plano | 0.518 | | |
| 14 | Image | Plano | | | |
| P.S. The focal lengths(f) and refractive indexes(Index) are caculated based on a wavelength of 587.6nm. | | | | | |

Fig.13

| TABLE 4 | | | | |
|---|---|---|---|---|
| Aspheric Coefficients | | | | |
| Surface # | 1 | 2 | 4 | 5 |
| k   = | -3.97139E-01 | 1.61889E-01 | -1.00000E+02 | -7.50392E-01 |
| A4 = | -4.03483E-03 | -1.15476E-02 | 6.16652E-02 | -5.05502E-03 |
| A6 = | -1.38325E-03 | -1.34176E-02 | -8.13852E-02 | 8.53087E-05 |
| A8 = | -3.42002E-04 | -2.66962E-03 | 4.65194E-02 | -2.46009E-03 |
| A10= | -3.82072E-05 | 9.17230E-04 | -1.18673E-02 | 1.29240E-03 |
| A12= | | | -3.77679E-03 | -5.24339E-04 |
| A14= | | | | 6.95425E-05 |
| Surface # | 6 | 7 | 8 | 9 |
| k   = | -1.55478E+00 | -8.68556E-01 | -5.34131E+00 | -1.00000E+02 |
| A4 = | -5.63815E-02 | 1.32399E-03 | -2.17643E-03 | 4.36929E-04 |
| A6 = | 1.59220E-02 | 2.78028E-03 | 1.58660E-04 | -3.75328E-04 |
| A8 = | -1.43729E-04 | 3.66319E-04 | -1.32402E-04 | -2.04201E-05 |
| A10= | | 1.10411E-05 | 1.68586E-05 | 2.66251E-06 |
| A12= | | 4.50002E-06 | -1.03688E-06 | -9.38977E-08 |
| A14= | | -7.47164E-07 | | |

Fig.14

| TABLE 5 | | | | | |
|---|---|---|---|---|---|
| (Embodiment 3) | | | | | |
| f = 6.55 mm, Fno = 2.80, HFOV = 28.1 deg. | | | | | |
| Surface # | | Curvature Radius | Thickness | Material | Focal length |
| 0 | Object | Plano | Infinity | | |
| 1 | Lens 1 | 3.56060 (ASP) | 0.863 | Plastic | OKP4HT | -14.67 |
| 2 | | 2.33094 (ASP) | 0.542 | | |
| 3 | Ape. Stop | Plano | 0.100 | | |
| 4 | Lens 2 | 7.24730 (ASP) | 1.248 | Plastic | APEL-5514ML | 3.93 |
| 5 | | -2.85311 (ASP) | 2.601 | | |
| 6 | Lens 3 | -0.79505 (ASP) | 0.644 | Plastic | OKP4HT | -3.57 |
| 7 | | -1.61269 (ASP) | 0.100 | | |
| 8 | Lens 4 | 2.52291 (ASP) | 2.449 | Plastic | APEL-5514ML | 4.16 |
| 9 | | -14.54200 (ASP) | 0.500 | | |
| 10 | Filter | Plano | 0.300 | Glass | BSC7 | - |
| 11 | | Plano | 0.300 | | |
| 12 | Cover-glass | Plano | 0.550 | Glass | BSC7 | - |
| 13 | | Plano | 0.742 | | |
| 14 | Image | Plano | | | |
| P.S. The focal lengths(f) and refractive indexes(Index) are caculated based on a wavelength of 587.6nm. | | | | | |

Fig.15

| TABLE 6 | | | | |
|---|---|---|---|---|
| Aspheric Coefficients | | | | |
| Surface # | 1 | 2 | 4 | 5 |
| k = | -1.19660E+00 | 7.95377E-01 | -1.00000E+02 | 1.75132E-01 |
| A4 = | -5.98504E-03 | -1.79292E-02 | 1.54709E-02 | -1.22733E-02 |
| A6 = | -1.06441E-03 | 7.27048E-05 | -1.69286E-02 | -2.19348E-03 |
| A8 = | 1.39578E-04 | -2.87339E-03 | 3.12583E-04 | -1.64897E-03 |
| A10= | 1.55537E-05 | 2.23705E-03 | 3.16029E-03 | 1.07254E-03 |
| A12= | | | -1.20936E-03 | -4.89542E-04 |
| A14= | | | | 4.74150E-05 |
| Surface # | 6 | 7 | 8 | 9 |
| k = | -1.85472E+00 | -1.06625E+00 | -1.10635E+01 | -1.00000E+02 |
| A4 = | -4.60993E-02 | 1.49039E-02 | -3.50130E-03 | -1.08683E-03 |
| A6 = | 1.20038E-02 | -1.36724E-03 | 5.32728E-04 | -5.91753E-05 |
| A8 = | -3.81552E-04 | 2.29309E-04 | -2.45153E-04 | -7.06061E-05 |
| A10= | | 2.90690E-05 | 2.80186E-05 | 6.03523E-06 |
| A12= | | -4.96935E-06 | -1.84504E-06 | -2.08359E-07 |
| A14= | | 2.90169E-07 | | |

Fig.16

| TABLE 7 | | | | | |
|---|---|---|---|---|---|
| (Embodiment 4) | | | | | |
| f = 5.95 mm, Fno = 2.45, HFOV = 35.2 deg. | | | | | |
| Surface # | | Curvature Radius | Thickness | Material | Focal length |
| 0 | Object | Plano | Infinity | | |
| 1 | Lens 1 | 4.50530 (ASP) | 1.952 | Plastic | PC | -119.04 |
| 2 | | 3.56040 (ASP) | 0.536 | | |
| 3 | Ape. Stop | Plano | 0.264 | | |
| 4 | Lens 2 | -6.05510 (ASP) | 2.855 | Plastic | ARTON-D4532 | 4.96 |
| 5 | | -2.05832 (ASP) | 1.022 | | |
| 6 | Lens 3 | -1.21587 (ASP) | 1.227 | Plastic | PC | -11.43 |
| 7 | | -2.04244 (ASP) | 0.811 | | |
| 8 | Lens 4 | 4.51990 (ASP) | 3.200 | Plastic | ARTON-D4532 | 8.62 |
| 9 | | -100.00000 (ASP) | 1.000 | | |
| 10 | Filter | Plano | 0.300 | Glass | BSC7 | - |
| 11 | | Plano | 0.500 | | |
| 12 | Cover-glass | Plano | 0.550 | Glass | BSC7 | - |
| 13 | | Plano | 1.533 | | |
| 14 | Image | Plano | | | |
| P.S. The focal lengths(f) and refractive indexes(Index) are caculated based on a wavelength of 830.0nm | | | | | |

Fig.17

| TABLE 8 | | | | |
|---|---|---|---|---|
| Aspheric Coefficients | | | | |
| Surface # | 1 | 2 | 4 | 5 |
| k = | 1.71949E+00 | 3.52718E+00 | 1.18187E+01 | -1.03895E+00 |
| A4 = | 1.75780E-03 | 1.18126E-03 | -1.07120E-02 | -1.56385E-03 |
| A6 = | 3.75197E-05 | -2.78892E-03 | 3.38365E-03 | -1.71560E-04 |
| A8 = | 1.53232E-05 | 1.43678E-03 | -2.98465E-03 | -3.79428E-04 |
| A10= | -3.91942E-06 | -9.81798E-04 | -6.59099E-04 | 1.75472E-04 |
| A12= | 6.63582E-07 | | 2.43973E-05 | -3.14042E-05 |
| A14= | | | | 1.69982E-06 |
| Surface # | 6 | 7 | 8 | 9 |
| k = | -1.65623E+00 | -6.84007E-01 | -1.13922E+00 | -2.00000E+01 |
| A4 = | -1.23411E-02 | 7.03931E-03 | -7.13712E-03 | -3.51967E-03 |
| A6 = | 2.94636E-03 | -7.28451E-05 | 6.77634E-04 | 3.51457E-04 |
| A8 = | -1.98757E-05 | 6.57041E-05 | -4.89722E-05 | -2.77086E-05 |
| A10= | -6.30753E-06 | -1.66235E-06 | 1.78944E-06 | 9.95200E-07 |
| A12= | | -3.28750E-07 | -2.79887E-08 | -1.45292E-08 |
| A14= | | 5.41326E-08 | | |

Fig.18

| TABLE 9 |||||||
|---|---|---|---|---|---|---|
| (Embodiment 5) |||||||
| f = 5.97 mm, Fno = 2.45, HFOV = 35.2 deg. |||||||
| Surface # | | Curvature Radius | Thickness | Material || Focal length |
| 0 | Object | Plano | Infinity | | | |
| 1 | Lens 1 | 5.55560 (ASP) | 1.848 | Plastic | ARTON-D4532 | -46.60 |
| 2 | | 3.99450 (ASP) | 0.292 | | | |
| 3 | Ape. Stop | Plano | 0.252 | | | |
| 4 | Lens 2 | -7.11740 (ASP) | 2.000 | Plastic | ARTON-D4532 | 5.57 |
| 5 | | -2.21125 (ASP) | 1.950 | | | |
| 6 | Lens 3 | -1.17115 (ASP) | 1.244 | Plastic | PC | -11.47 |
| 7 | | -1.97685 (ASP) | 0.807 | | | |
| 8 | Lens 4 | 3.74910 (ASP) | 2.947 | Plastic | ARTON-D4532 | 7.20 |
| 9 | | -100.00000 (ASP) | 1.000 | | | |
| 10 | Filter | Plano | 0.700 | Glass | BSC7 | - |
| 11 | | Plano | 0.500 | | | |
| 12 | Cover-glass | Plano | 0.550 | Glass | BSC7 | - |
| 13 | | Plano | 0.809 | | | |
| 14 | Image | Plano | | | | |
| P.S. The focal lengths(f) and refractive indexes(Index) are caculated based on a wavelength of 830.0nm |||||||

Fig.19

| TABLE 10 | | | | |
|---|---|---|---|---|
| Aspheric Coefficients | | | | |
| Surface # | 1 | 2 | 4 | 5 |
| k = | -1.11298E-01 | 1.75390E+00 | 7.14830E+00 | -7.74152E-01 |
| A4 = | 2.81319E-03 | 5.43829E-03 | -1.53095E-02 | -5.62124E-03 |
| A6 = | 1.20705E-04 | -4.38551E-03 | -9.04819E-06 | -1.95660E-04 |
| A8 = | -1.45135E-05 | 5.27093E-03 | -2.52841E-03 | -6.15787E-04 |
| A10= | 1.16367E-05 | -2.24251E-03 | 2.19434E-05 | 1.96810E-04 |
| A12= | -7.91157E-07 | | 2.43973E-05 | -3.11368E-05 |
| A14= | | | | -6.40588E-07 |
| Surface # | 6 | 7 | 8 | 9 |
| k = | -1.61837E+00 | -7.08023E-01 | -1.36084E+00 | 2.00000E+01 |
| A4 = | -1.30039E-02 | 6.59062E-03 | -7.48922E-03 | -3.71198E-03 |
| A6 = | 2.97045E-03 | -1.19364E-05 | 7.26897E-04 | 4.09465E-04 |
| A8 = | -3.79140E-05 | 6.14763E-05 | -5.06438E-05 | -2.85969E-05 |
| A10= | -4.99516E-06 | -2.96117E-07 | 1.99781E-06 | 9.81585E-07 |
| A12= | | -4.97991E-07 | -3.87814E-08 | -1.63768E-08 |
| A14= | | 5.03152E-08 | | |

Fig.20

| TABLE 11 | | | | | |
|---|---|---|---|---|---|
| | Embodiment 1 | Embodiment 2 | Embodiment 3 | Embodiment 4 | Embodiment 5 |
| f | 6.02 | 5.83 | 6.55 | 5.95 | 5.97 |
| Fno | 2.45 | 2.80 | 2.80 | 2.45 | 2.45 |
| HFOV | 35.2 | 31.1 | 28.1 | 35.2 | 35.2 |
| V2-V3 | 26.6 | 32.5 | 32.5 | 26.6 | 26.6 |
| f/f1 | -0.30 | -0.16 | -0.45 | -0.05 | -0.13 |
| f/f2 | 0.92 | 1.47 | 1.67 | 1.20 | 1.07 |
| f/f3 | -0.35 | -1.51 | -1.83 | -0.52 | -0.52 |
| R1/R2 | 1.68 | 1.31 | 1.53 | 1.27 | 1.39 |
| |R3/R4| | 30.31 | 1.75 | 2.54 | 2.94 | 3.22 |
| |R7/R8| | 0.20 | 0.10 | 0.17 | 0.05 | 0.04 |
| T12/f | 0.14 | 0.07 | 0.10 | 0.13 | 0.09 |
| SAG32/f | -0.34 | -0.19 | -0.17 | -0.32 | -0.35 |
| N | 4 | 4 | 4 | 4 | 4 |
| |HFOV/CRA| | 19.7 | 3.2 | 2.3 | 17.4 | 15.3 |
| TTL/ImgH | 3.54 | 2.97 | 2.99 | 3.72 | 3.48 |

Fig.21

IMAGING LENS ASSEMBLY

BACKGROUND OF THE INVENTION

1. Field of the Invention

The present invention relates to an imaging lens assembly, and more particularly, to a compact imaging lens assembly applicable to electronic products.

2. Description of the Prior Art

In recent years, with the popularity of mobile phone cameras, micromonitors, car lenses and electronic products with imaging function, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A prior art compact high resolution imaging lens assembly, such as the one disclosed in U.S. Pat. No. 7,365,920, generally comprises four lens elements and a stop disposed in front of the four lens elements, wherein the first and second lens elements are adhered by means of two glass spherical surface lenses to form a doublet and thereby to correct the chromatic aberration. Such an arrangement of optical elements, however, has the following disadvantages: (1) the freedom of the system is curtailed due to the employment of excess number of glass spherical surface lenses, thus the total track length of the system cannot be reduced easily; (2) the process of adhering the glass lenses together is complicated, posing difficulties in manufacture.

U.S. Pat. No. 7,277,238 provides an imaging lens array comprising four respective lenses wherein a plurality of lenses are double-sided aspherical lenses so that the total track length of the system can be effectively reduced and the image quality can be improved as well. However, placing the stop in front of the first lens element increases the sensitivity of the system, making it more difficult to control the manufacturing yields of the lens assembly.

Therefore, a need exists in the art for an imaging lens assembly that requires simple manufacturing process, maintains a moderate total track length and is applicable to electronic products.

SUMMARY OF THE INVENTION

The present invention provides an imaging lens assembly comprising, in order from an object side to an image side: a first lens element with negative refractive power having a convex object-side surface and a concave image-side surface; a second lens element with positive refractive power having a convex image-side surface; a third lens element with negative refractive power having a concave object-side surface and a convex image-side surface, both surfaces being aspheric; a fourth lens element with positive refractive power having a convex object-side surface, both surfaces being aspheric; and a stop disposed between the first lens element and the second lens; wherein the distance near the optical axis between the first lens element and the second lens element is T12, the focal length of the imaging lens assembly is f, the focal length of the second lens element is f2, the number of the lens elements with refractive power is N, and they satisfy the relations: $0.00<T12/f<2.50$, $0.60<f/f2<1.72$, $4\leq N\leq 6$.

Such an arrangement of optical elements can effectively reduce the total track length of the imaging lens assembly, achieve a wide field of view and improve the image quality.

In the aforementioned imaging lens assembly, the first lens element has negative refractive power, a convex object-side surface and a concave image-side surface, thereby facilitating the enlargement of the field of view of the imaging lens assembly. The second lens element has positive refractive power and may be a bi-convex lens element or a meniscus lens element having a concave object-side surface and a convex image-side surface. When the second lens element is a bi-convex lens element, the refractive power thereof can be distributed more favorably, thus allowing a shortening of the total track length of the imaging lens assembly. When the second lens element is a meniscus lens element, the astigmatism of the imaging lens assembly can be favorably corrected. The third lens element has negative refractive power, a concave object-side surface and a convex image-side surface so that the chromatic aberration of the imaging lens assembly can be favorably corrected, and such a configuration also prevents the high order aberrations from becoming too large. The fourth lens element has positive refractive power and may be a bi-convex lens element or a meniscus lens element having a convex object-side surface and a concave image-side surface. When the fourth lens element is a bi-convex lens element, the positive refractive power thereof can be distributed more favorably, thereby a balance between the refractive power of the fourth lens element and that of the second lens element can be achieved to effectively reduce the sensitivity of the imaging lens assembly. When the fourth lens element is a meniscus lens element, the astigmatism of the system can be favorably corrected, thereby improving the image quality.

In the aforementioned imaging lens assembly, the second lens element provides positive refractive power, and the stop is disposed near the object side of the imaging lens assembly, thereby the total track length of the imaging lens assembly can be effectively reduced. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the fourth lens element may be provided with at least one inflection point, thereby the angle at which the light is projected onto the sensor from the off-axis field can be effectively reduced to further correct the off-axis aberrations. In addition, for optical systems with a wide field of view, the correction of distortion and chromatic aberration of magnification is especially necessary, and the correction can be made by placing the stop in a location where the refractive power of the optical system is balanced. In the aforementioned imaging lens assembly, the stop is disposed between the first lens element and the second lens element so as to get a good balance between the reduction of the total track length and the obtainment of a wide field of view. Such an arrangement of the stop also effectively reduces the sensitivity of the imaging lens assembly.

The present invention provides another imaging lens assembly comprising, in order from the object side to the image side: a first lens element with negative refractive power having a convex object-side surface and a concave image-side surface; a second lens element with positive refractive power having a concave object-side surface and a convex image-side surface; a third lens element with negative refractive power having a concave object-side surface and a convex image-side surface, at least one of the object-side and image-side surfaces thereof being aspheric; a fourth lens element with positive refractive power having a convex object-side surface, at least one of the object-side and image-side surfaces thereof being aspheric; and a stop disposed between the first lens element and the second lens element; wherein there are only four lens elements with refractive power.

The present invention provides yet another imaging lens assembly comprising, in order from the object side to the image side: a first lens element with negative refractive power having a convex object-side surface and a concave image-side surface; a second lens element with positive refractive power having a convex image-side surface; a third lens element with negative refractive power having a concave object-side surface and a convex image-side surface, at least one of the object-side and image-side surfaces thereof being aspheric; a fourth lens element with positive refractive power having a convex object-side surface and a convex image-side surface, at least one of the object-side and image-side surfaces thereof being aspheric; and a stop disposed between the first lens element and the second lens element; wherein there are only four lens elements with refractive power.

BRIEF DESCRIPTION OF THE DRAWINGS

FIG. 11 is TABLE 1 which lists the optical data of the first embodiment.

FIG. 12 is TABLE 2 which lists the aspheric surface data of the first embodiment.

FIG. 13 is TABLE 3 which lists the optical data of the second embodiment.

FIG. 14 is TABLE 4 which lists the aspheric surface data of the second embodiment.

FIG. 15 is TABLE 5 which lists the optical data of the third embodiment.

FIG. 16 is TABLE 6 which lists the aspheric surface data of the third embodiment.

FIG. 17 is TABLE 7 which lists the optical data of the fourth embodiment.

FIG. 18 is TABLE 8 which lists the aspheric surface data of the fourth embodiment.

FIG. 19 is TABLE 9 which lists the optical data of the fifth embodiment.

FIG. 20 is TABLE 10 which lists the aspheric surface data of the fifth embodiment.

FIG. 21 is TABLE 11 which lists the data of the respective embodiments resulted from the equations.

DETAILED DESCRIPTION OF THE PREFERRED EMBODIMENTS

Figure 1:
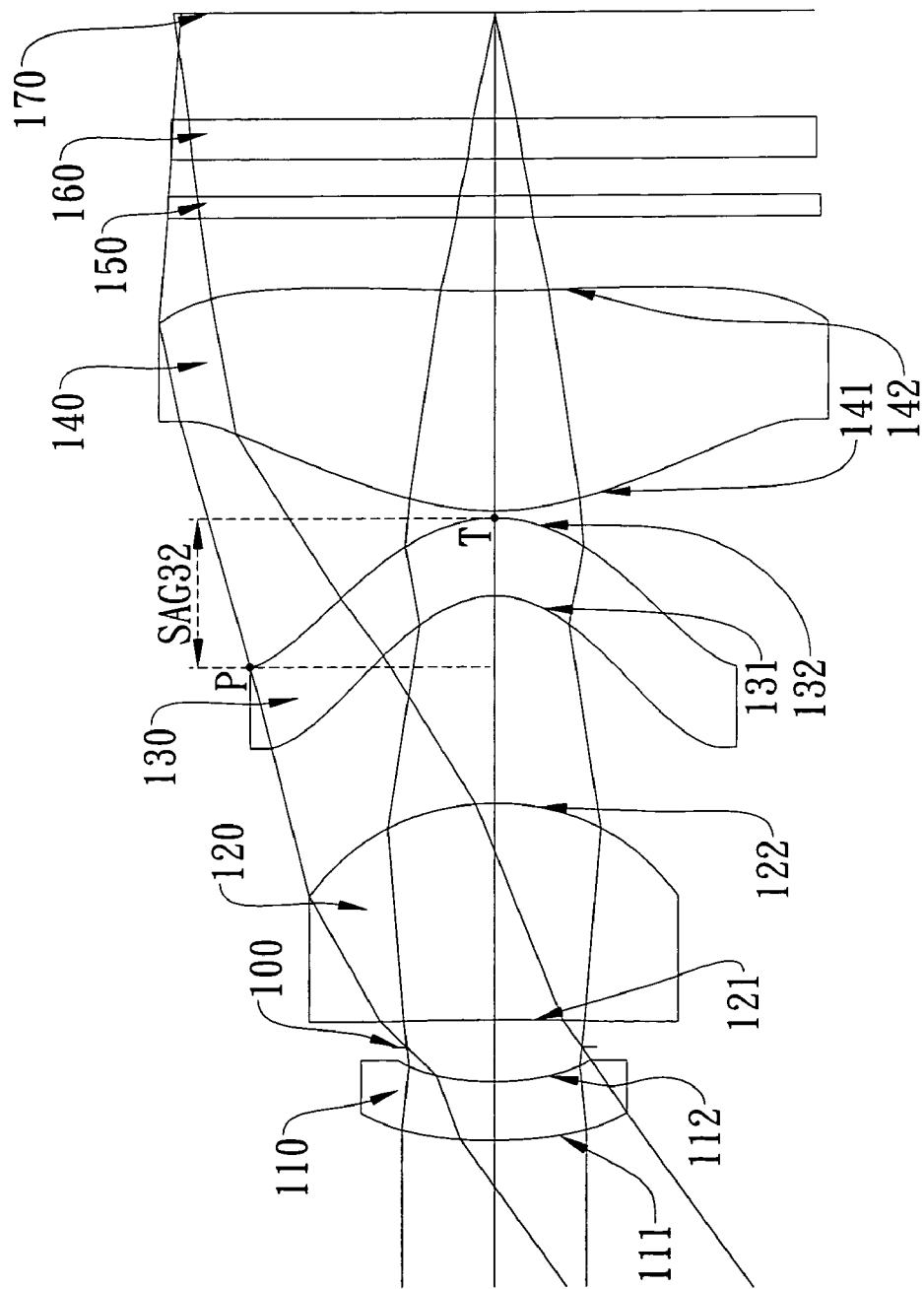
FIG. 1 shows an imaging lens assembly in accordance with a first embodiment of the present invention.

The present invention provides an imaging lens assembly comprising, in order from an object side to an image side: a first lens element with negative refractive power having a convex object-side surface and a concave image-side surface; a second lens element with positive refractive power having a convex image-side surface; a third lens element with negative refractive power having a concave object-side surface and a convex image-side surface, the object-side and image-side surfaces thereof being aspheric; a fourth lens element with positive refractive power having a convex object-side surface, the object-side and image-side surfaces thereof being aspheric; and a stop disposed between the first lens element and the second lens element; wherein the distance near the optical axis between the first lens element and the second lens element is T12, the focal length of the imaging lens assembly is f, the focal length of the second lens element is f2, the number of the lens elements with refractive power is N, and they satisfy the relations: $0.00<T12/f<2.50$, $0.60<f/f2<1.72$, $4 \leq N \leq 6$.

When the relation of $0.00<T12/f<2.50$ is satisfied, the high order aberrations of the imaging lens assembly can be favorably corrected to improve the image quality. The above relation also enables the lens elements to be spaced more closely, thereby facilitating a reduction in the total track length of the imaging lens assembly. Preferably, T12 and f satisfy the relation: $0.00<T12/f<0.60$. And it will be more preferable that T12 and f satisfy the relation: $0.00<T12/f<0.25$.

When the relation of $0.60<f/f2<1.72$ is satisfied, the refractive power of the second lens element is more balanced so that the total track length of the imaging lens assembly can be effectively controlled. The above relation also prevents the high order spherical aberration from becoming too large, so that the image quality of the imaging lens assembly can be improved. Preferably, f and f2 satisfy the relation: $0.85<f/f2<1.40$.

In the aforementioned imaging lens assembly, it is preferable that at least one of the object-side and image-side surfaces of the first lens element is aspheric, so as to facilitate the enlargement of the field of view of the system and to prevent the aberrations from becoming too large.

In the aforementioned imaging lens assembly, it is preferable that the object-side surface of the second lens element is concave so that the second lens element is of a concave-convex shape (meniscus type), thereby facilitating the correction of the astigmatism of the imaging lens assembly.

In the aforementioned imaging lens assembly, it is preferable that the fourth lens element has a concave image-side surface so that the astigmatism of the system can be favorably corrected, thereby improving the image quality of the imaging lens assembly.

In the aforementioned imaging lens assembly, the focal length of the imaging lens assembly is f, the focal length of the first lens element is f1, and they preferably satisfy the relation: $-0.50<f/f1<-0.10$. When the above relation is satisfied, a balance between the enlargement of the field of view and the reduction of the total track length can be achieved favorably.

In the aforementioned imaging lens assembly, the Abbe number of the second lens element is V2, the Abbe number of the third lens element is V3, and they preferably satisfy the relation: 20<V2-V3<40. The above relation facilitates the correction of the chromatic aberration of the system.

In the aforementioned imaging lens assembly, the radius of curvature of the object-side surface of the first lens element is R1, the radius of curvature of the image-side surface of the first lens element is R2, and they preferably satisfy the relation: 1.00<R1/R2<2.30. The above relation facilitates the enlargement of the field of view of the imaging lens assembly so that a wide field of view can be achieved.

In the aforementioned imaging lens assembly, the vertex of the image-side surface of the third lens element through which the optical axis extends is T, the farthest point of the effective area (the clear aperture radius position) of the image-side surface that allows incoming light to pass through the third lens element is P, the distance near the optical axis between T and P is SAG32 (the direction toward the object side is defined as a negative direction while the direction toward the image side is defined as a positive direction), the focal length of the imaging lens assembly is f, and they preferably satisfy the relation: −0.50<SAG32/f<−0.25. The above relation effectively reduces the angle at which the light is projected onto the sensor and enhances the imaging lens assembly's capability to correct the off-axis aberrations.

In the aforementioned imaging lens assembly, the radius of curvature of the object-side surface of the second lens element is R3, the radius of curvature of the image-side surface of the second lens element is R4, and they preferably satisfy the relation: 1.65<|R3/R4|. When the above relation is satisfied, the total track length of the imaging lens assembly can be effectively reduced. The above relation also prevents the high order aberrations from becoming too large.

In the aforementioned imaging lens assembly, the radius of curvature of the object-side surface of the fourth lens element is R7, the radius of curvature of the image-side surface of the fourth lens element is R8, and they preferably satisfy the relation: |R7/R8|<0.35. The above relation facilitates the correction of the coma aberration of the imaging lens assembly and prevents other kinds of aberration from becoming too large.

In the aforementioned imaging lens assembly, half of the maximal field of view of the imaging lens assembly is HFOV, the maximum angle at which the chief ray is projected onto the electronic sensor is CRA, and they preferably satisfy the relation: 5.0<|HFOV/CRA|. When the above relation is satisfied, this helps to ensure that the imaging lens assembly has a wide field of view. The above relation also reduces the angle at which the light is projected onto the sensor effectively, thereby improving the sensitivity of the sensor.

The aforementioned imaging lens assembly further comprises an electronic sensor on which an object is imaged. The distance near the optical axis between the object-side surface of the first lens element and the electronic sensor is TTL, half of the diagonal length of the effective pixel area of the electronic sensor is ImgH, and they preferably satisfy the relation: TTL/ImgH<4.0. The above relation enables the imaging lens assembly to maintain a compact form so that it can be equipped in compact portable electronic products.

According to another aspect of the present invention, there is provided an imaging lens assembly comprising, in order from the object side to the image side: a first lens element with negative refractive power having a convex object-side surface and a concave image-side surface; a second lens element with positive refractive power having a concave object-side surface and a convex image-side surface; a third lens element with negative refractive power having a concave object-side surface and a convex image-side surface, at least one of the object-side and image-side surfaces thereof being aspheric; a fourth lens element with positive refractive power having a convex object-side surface, at least one of the object-side and image-side surfaces thereof being aspheric; and a stop disposed between the first lens element and the second lens element; wherein there are only four lens elements with refractive power.

In the aforementioned imaging lens assembly, the focal length of the imaging lens assembly is f, the focal length of the second lens element is f2, and they preferably satisfy the relation: 0.60<f/f2<1.72. When the above relation is satisfied, the refractive power of the second lens element is more balanced so that the total track length of the imaging lens assembly can be effectively controlled. The above relation also prevents the high order spherical aberration from becoming too large, so that the image quality of the imaging lens assembly can be improved. And it will be more preferable that f and f2 satisfy the relation: 0.85<f/f2<1.40.

In the aforementioned imaging lens assembly, the distance near the optical axis between the first lens element and the second lens element is T12, the focal length of the imaging lens assembly is f, and they preferably satisfy the relation: 0.00<T12/f<0.25. When the above relation is satisfied, the high order aberrations of the imaging lens assembly can be favorably corrected to improve the image quality. The above relation also enables the lens elements to be spaced more closely, thereby facilitating a reduction in the total track length of the imaging lens assembly.

In the aforementioned imaging lens assembly, the focal length of the imaging lens assembly is f, the focal length of the third lens element is f3, and they preferably satisfy the relation: −0.80<f/f3<−0.15. The above relation effectively improves the imaging lens assembly's capability to correct the chromatic aberration.

In the aforementioned imaging lens assembly, the radius of curvature of the object-side surface of the second lens element is R3, the radius of curvature of the image-side surface of the second lens element is R4, and they preferably satisfy the relation: 2.00<|R3/R4|. When the above relation is satisfied, the total track length of the imaging lens assembly can be effectively reduced. The above relation also prevents the high order aberrations from becoming too large.

According to yet another aspect of the present invention, there is provided an imaging lens assembly comprising, in order from the object side to the image side: a first lens element with negative refractive power having a convex object-side surface and a concave image-side surface; a second lens element with positive refractive power having a convex image-side surface; a third lens element with negative refractive power having a concave object-side surface and a convex image-side surface, at least one of the object-side and image-side surfaces thereof being aspheric; a fourth lens element with positive refractive power having a convex object-side surface and a convex image-side surface, at least one of the object-side and image-side surfaces thereof being aspheric; and a stop disposed between the first lens element and the second lens element; wherein there are only four lens elements with refractive power.

In the aforementioned imaging lens assembly, the focal length of the imaging lens assembly is f, the focal length of the second lens element is f2, and they preferably satisfy the relation: 0.60<f/f2<1.72. When the above relation is satisfied, the refractive power of the second lens element is more balanced so that the total track length of the imaging lens assembly can be effectively controlled. The above relation also prevents the high order spherical aberration from becoming too large, so that the image quality of the imaging lens assembly can be improved.

In the aforementioned imaging lens assembly, the distance near the optical axis between the first lens element and the second lens element is T12, the focal length of the imaging lens assembly is f, and they preferably satisfy the relation: 0.00<T12/f<0.25. When the above relation is satisfied, the high order aberrations of the imaging lens assembly can be favorably corrected to improve the image quality. The above relation also enables the lens elements to be spaced more closely, thereby facilitating a reduction in the total track length of the imaging lens assembly.

In the aforementioned imaging lens assembly, the radius of curvature of the object-side surface of the fourth lens element is R7, the radius of curvature of the image-side surface of the fourth lens element is R8, and they preferably satisfy the relation: |R7/R8|<0.35. The above relation facilitates the correction of the coma aberration of the imaging lens assembly and prevents other kinds of aberration from becoming too large.

In the present imaging lens assembly, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be reduced effectively.

In the present imaging lens assembly, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
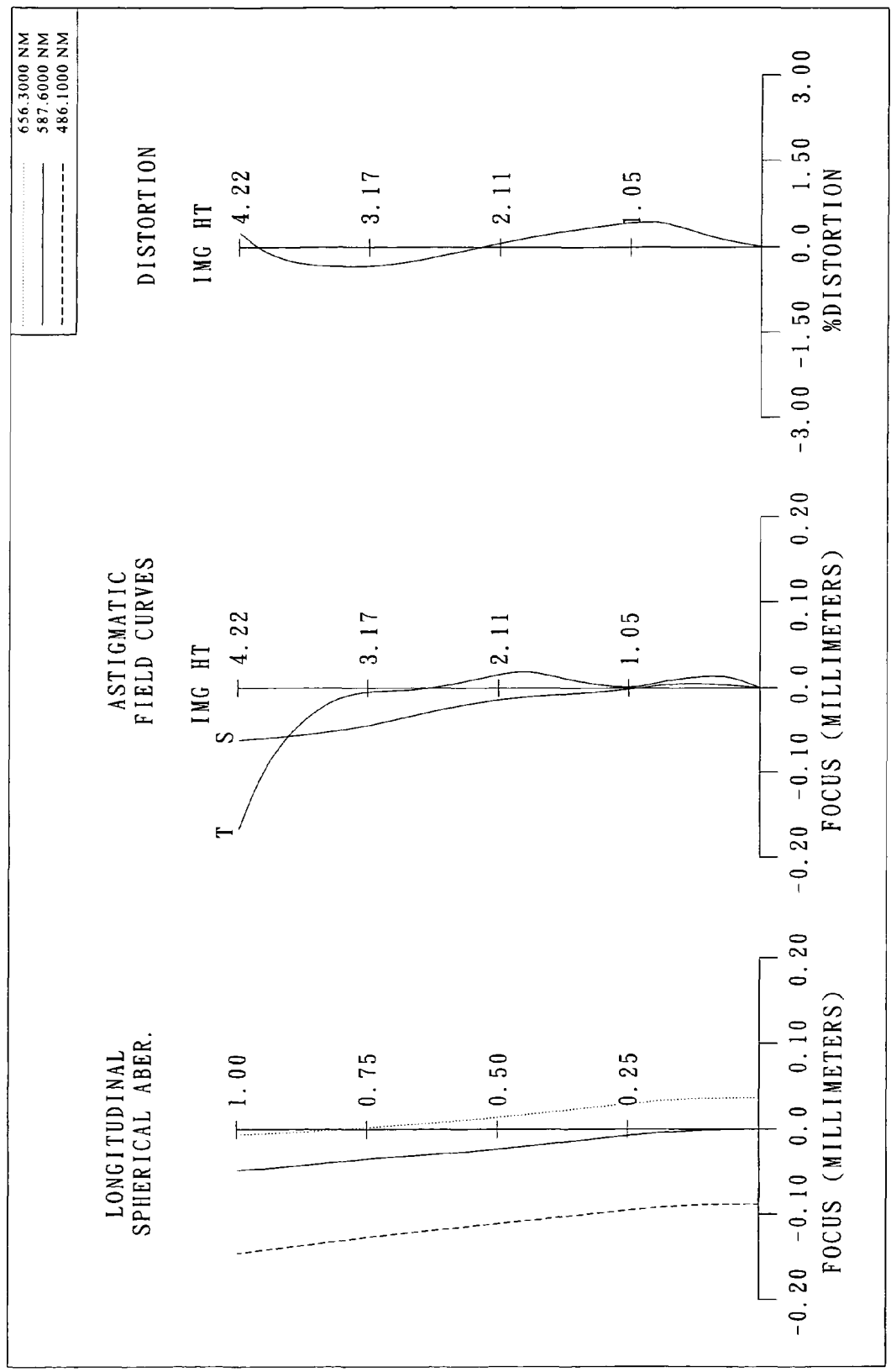
FIG. 2 shows the aberration curves of the first embodiment of the present invention.

FIG. 1 shows an imaging lens assembly in accordance with a first embodiment of the present invention, and FIG. 2 shows the aberration curves of the first embodiment of the present invention. The imaging lens assembly of the first embodiment of the present invention mainly comprises four lens elements, in order from the object side to the image side: a plastic first lens element 110 with negative refractive power having a convex object-side surface 111 and a concave image-side surface 112, the object-side and image-side surfaces 111 and 112 thereof being aspheric; a plastic second lens element 120 with positive refractive power having a concave object-side surface 121 and a convex image-side surface 122, the object-side and image-side surfaces 121 and 122 thereof being aspheric; a plastic third lens element 130 with negative refractive power having a concave object-side surface 131 and a convex image-side surface 132, the object-side and image-side surfaces 131 and 132 thereof being aspheric; and a plastic fourth lens element 140 with positive refractive power having a convex object-side surface 141 and a concave image-side surface 142, the object-side and image-side surfaces 141 and 142 thereof being aspheric and each of which being provided with at least one inflection point; and a stop 100 disposed between the first lens element 110 and the second lens element 120. The imaging lens assembly further comprises a filter 150 and a cover glass 160 disposed between the image-side surface 142 of the fourth lens element 140 and an image plane 170; the filter 150 and the cover glass 160 are made of glass and have no influence on the focal length of the imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=6.02 (mm).

In the first embodiment of the present imaging lens assembly, the f-number of the imaging lens assembly is Fno, and it satisfies the relation: Fno=2.45.

In the first embodiment of the present imaging lens assembly, half of the field of view of the imaging lens assembly is HFOV, and it satisfies the relation: HFOV=35.2 (degrees).

In the first embodiment of the present imaging lens assembly, the Abbe number of the second lens element 120 is V2, the Abbe number of the third lens element 130 is V3, and they satisfy the relation: V2−V3=26.6.

In the first embodiment of the present imaging lens assembly, the focal length of the imaging lens assembly is f, the focal length of the first lens element 110 is f1, and they satisfy the relation: f/f1=−0.30.

In the first embodiment of the present imaging lens assembly, the focal length of the imaging lens assembly is f, the focal length of the second lens element 120 is f2, and they satisfy the relation: f/f2=0.92.

In the first embodiment of the present imaging lens assembly, the focal length of the imaging lens assembly is f, the focal length of the third lens element 130 is f3, and they satisfy the relation: f/f3=−0.35.

In the first embodiment of the present imaging lens assembly, the radius of curvature of the object-side surface 111 of the first lens element 110 is R1, the radius of curvature of the image-side surface 112 of the first lens element 110 is R2, and they satisfy the relation: R1/R2=1.68.

In the first embodiment of the present imaging lens assembly, the radius of curvature of the object-side surface 121 of the second lens element 120 is R3, the radius of curvature of the image-side surface 122 of the second lens element 120 is R4, and they satisfy the relation: |R3/R4|=30.31.

In the first embodiment of the present imaging lens assembly, the radius of curvature of the object-side surface 141 of the fourth lens element 140 is R7, the radius of curvature of the image-side surface 142 of the fourth lens element 140 is R8, and they satisfy the relation: |R7/R8|=0.20.

In the first embodiment of the present imaging lens assembly, the distance near the optical axis between the first lens element 110 and the second lens element 120 is T12, the focal length of the imaging lens assembly is f, and they satisfy the relation: T12/f=0.14.

In the first embodiment of the present imaging lens assembly, the vertex of the image-side surface 132 of the third lens element 130 through which the optical axis extends is T, the farthest point of the effective area (the clear aperture radius position) of the image-side surface 132 that allows incoming light to pass through the third lens element 130 is P, the distance near the optical axis between T and P is SAG32, the focal length of the imaging lens assembly is f, and they satisfy the relation: SAG32/f=−0.34.

In the first embodiment of the present imaging lens assembly, the number of the lens elements with refractive power is N, and it satisfies the relation: N=4.

In the first embodiment of the present imaging lens assembly, half of the maximal field of view of the imaging lens assembly is HFOV, the maximum angle at which the chief ray is projected onto the electronic sensor is CRA, and they satisfy the relation: |HFOV/CRA|=19.7.

In the first embodiment of the present imaging lens assembly, the imaging lens assembly further comprises an electronic sensor on which an object is imaged. The distance near the optical axis between the object-side surface 111 of the first lens element 110 and the electronic sensor is TTL, half of the diagonal length of the effective pixel area of the electronic sensor is ImgH, and they satisfy the relation: TTL/ImgH=3.54.

The detailed optical data of the first embodiment is shown in FIG. 11 (TABLE 1), and the aspheric surface data is shown in FIG. 12 (TABLE 2), wherein the units of the radius of curvature, the thickness and the focal length are expressed in mm, HFOV is half of the maximal field of view, and the focal lengths and refractive indexes of the first embodiment are calculated based on a wavelength of 587.6 (nm).

Figure 3:
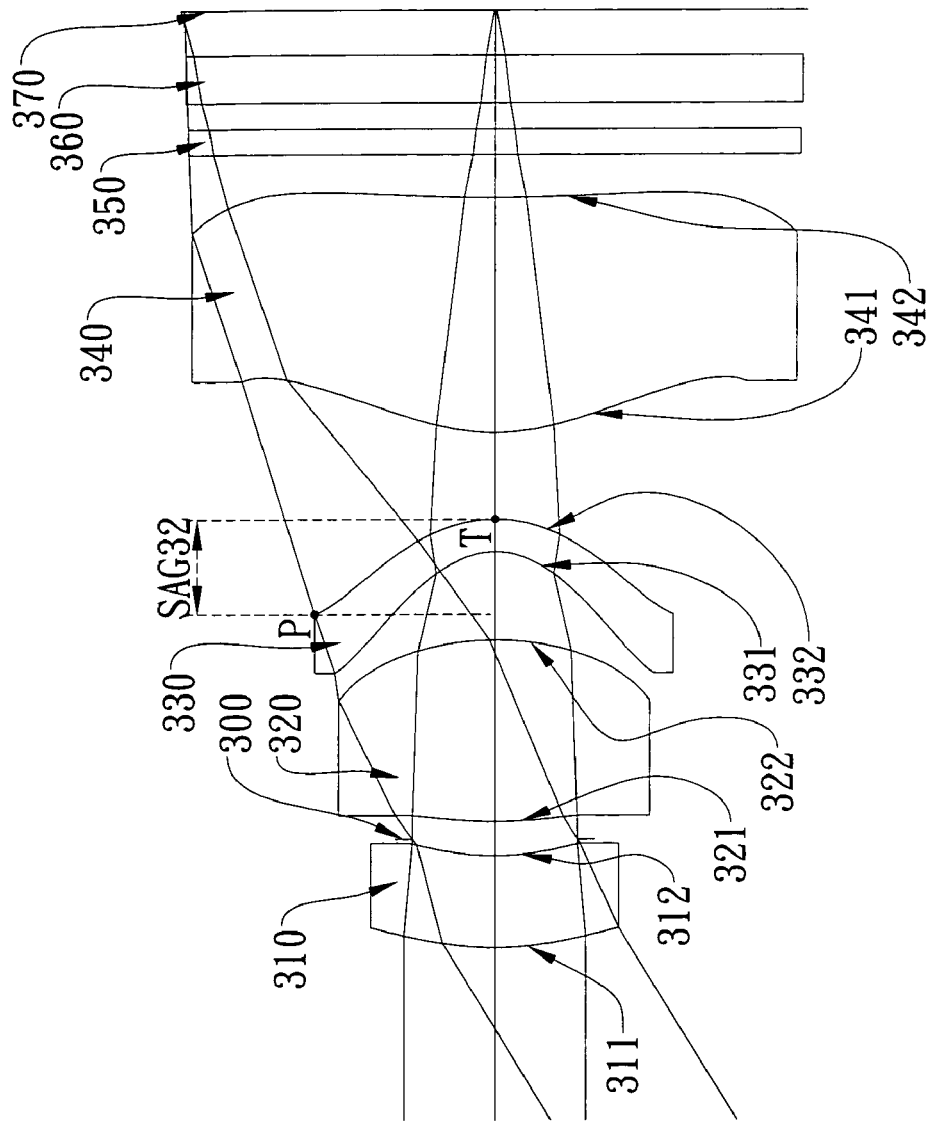
FIG. 3 shows an imaging lens assembly in accordance with a second embodiment of the present invention.
Figure 4:
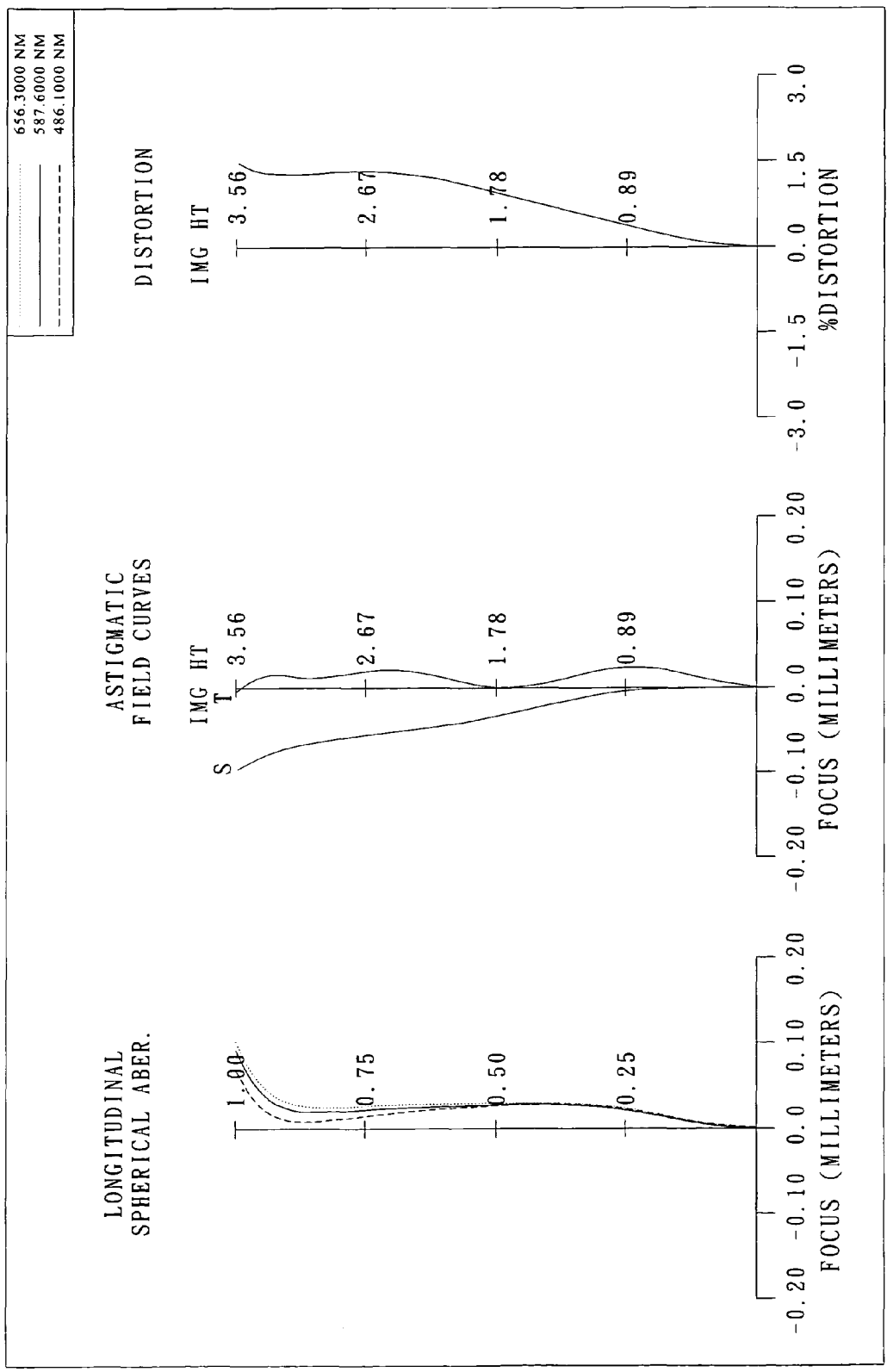
FIG. 4 shows the aberration curves of the second embodiment of the present invention.

FIG. 3 shows an imaging lens assembly in accordance with a second embodiment of the present invention, and FIG. 4 shows the aberration curves of the second embodiment of the present invention. The imaging lens assembly of the second embodiment of the present invention mainly comprises four lens elements, in order from the object side to the image side: a plastic first lens element 310 with negative refractive power having a convex object-side surface 311 and a concave image-side surface 312, the object-side and image-side surfaces 311 and 312 thereof being aspheric; a plastic second lens element 320 with positive refractive power having a convex object-side surface 321 and a convex image-side surface 322, the object-side and image-side surfaces 321 and 322 thereof being aspheric; a plastic third lens element 330 with negative refractive power having a concave object-side surface 331 and a convex image-side surface 332, the object-side and image-side surfaces 331 and 332 thereof being aspheric; and a plastic fourth lens element 340 with positive refractive power having a convex object-side surface 341 and a concave image-side surface 342, the object-side and image-side surfaces 341 and 342 thereof being aspheric and each of which being provided with at least one inflection point; and a stop 300 disposed between the first lens element 310 and the second lens element 320. The imaging lens assembly further comprises a filter 350 and a cover glass 360 disposed between the image-side surface 342 of the fourth lens element 340 and an image plane 370; the filter 350 and the cover glass 360 are made of glass and have no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=5.83 (mm).

In the second embodiment of the present imaging lens assembly, the f-number of the imaging lens assembly is Fno, and it satisfies the relation: Fno=2.80.

In the second embodiment of the present imaging lens assembly, half of the field of view of the imaging lens assembly is HFOV, and it satisfies the relation: HFOV=31.1 (degrees).

In the second embodiment of the present imaging lens assembly, the Abbe number of the second lens element 320 is V2, the Abbe number of the third lens element 330 is V3, and they satisfy the relation: V2−V3=32.5.

In the second embodiment of the present imaging lens assembly, the focal length of the imaging lens assembly is f, the focal length of the first lens element 310 is f1, and they satisfy the relation: f/f1=−0.16.

In the second embodiment of the present imaging lens assembly, the focal length of the imaging lens assembly is f, the focal length of the second lens element 320 is f2, and they satisfy the relation: f/f2=1.47.

In the second embodiment of the present imaging lens assembly, the focal length of the imaging lens assembly is f, the focal length of the third lens element 330 is f3, and they satisfy the relation: f/f3=−1.51.

In the second embodiment of the present imaging lens assembly, the radius of curvature of the object-side surface 311 of the first lens element 310 is R1, the radius of curvature of the image-side surface 312 of the first lens element 310 is R2, and they satisfy the relation: R1/R2=1.31.

In the second embodiment of the present imaging lens assembly, the radius of curvature of the object-side surface 321 of the second lens element 320 is R3, the radius of curvature of the image-side surface 322 of the second lens element 320 is R4, and they satisfy the relation: |R3/R4|=1.75.

In the second embodiment of the present imaging lens assembly, the radius of curvature of the object-side surface 341 of the fourth lens element 340 is R7, the radius of curvature of the image-side surface 342 of the fourth lens element 340 is R8, and they satisfy the relation: |R7/R8|=0.10.

In the second embodiment of the present imaging lens assembly, the distance near the optical axis between the first lens element 310 and the second lens element 320 is T12, the focal length of the imaging lens assembly is f, and they satisfy the relation: T12/f=0.07.

In the second embodiment of the present imaging lens assembly, the vertex of the image-side surface 332 of the third lens element 330 through which the optical axis extends is T, the farthest point of the effective area (the clear aperture radius position) of the image-side surface 332 that allows incoming light to pass through the third lens element 330 is P, the distance near the optical axis between T and P is SAG32, the focal length of the imaging lens assembly is f, and they satisfy the relation: SAG32/f=−0.19.

In the second embodiment of the present imaging lens assembly, the number of the lens elements with refractive power is N, and it satisfies the relation: N=4.

In the second embodiment of the present imaging lens assembly, half of the maximal field of view of the imaging lens assembly is HFOV, the maximum angle at which the chief ray is projected onto the electronic sensor is CRA, and they satisfy the relation: |HFOV/CRA|=3.2.

In the second embodiment of the present imaging lens assembly, the imaging lens assembly further comprises an electronic sensor on which an object is imaged. The distance near the optical axis between the object-side surface 311 of the first lens element 310 and the electronic sensor is TTL, half of the diagonal length of the effective pixel area of the electronic sensor is ImgH, and they satisfy the relation: TTL/ImgH=2.97.

The detailed optical data of the second embodiment is shown in FIG. 13 (TABLE 3), and the aspheric surface data is shown in FIG. 14 (TABLE 4), wherein the units of the radius of curvature, the thickness and the focal length are expressed in mm, HFOV is half of the maximal field of view, and the focal lengths and refractive indexes of the second embodiment are calculated based on a wavelength of 587.6 (nm).

Figure 5:
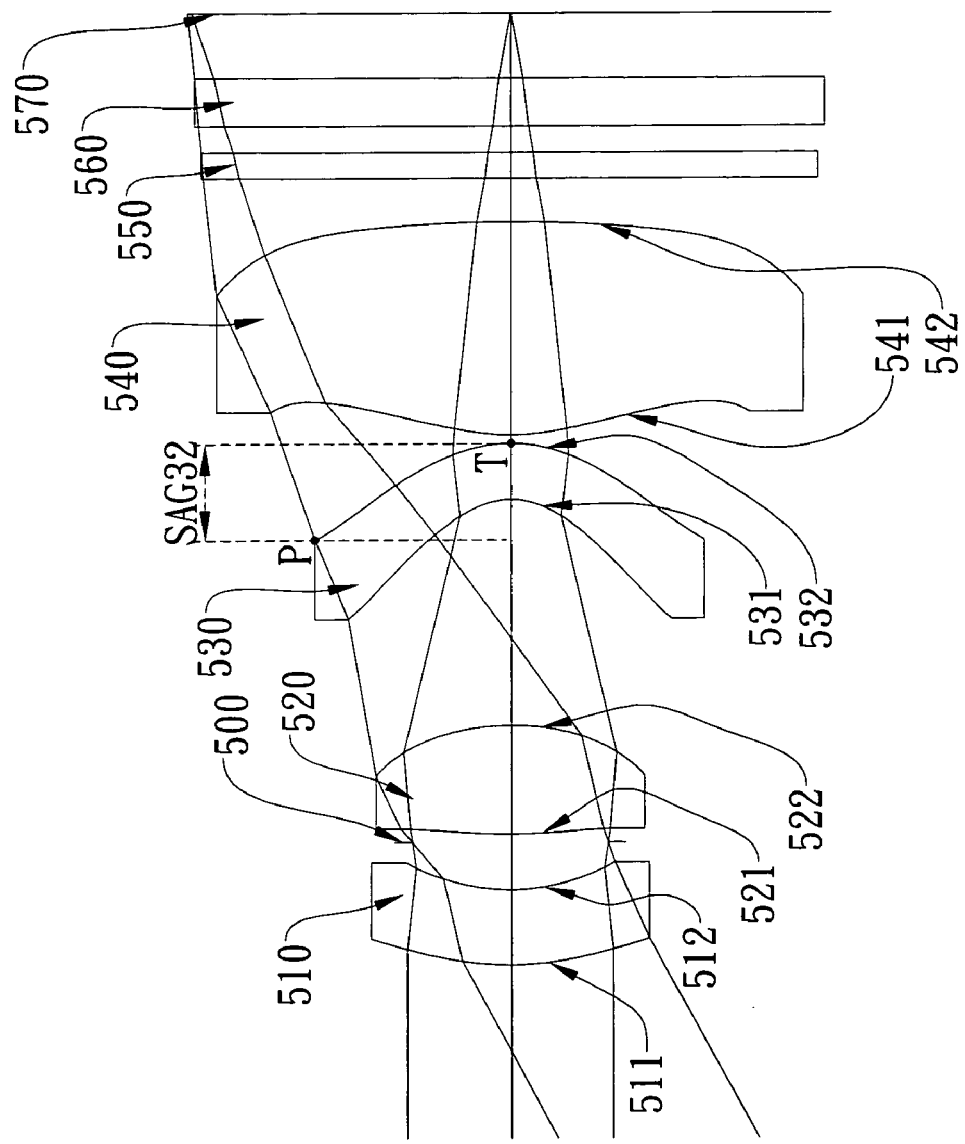
FIG. 5 shows an imaging lens assembly in accordance with a third embodiment of the present invention.
Figure 6:
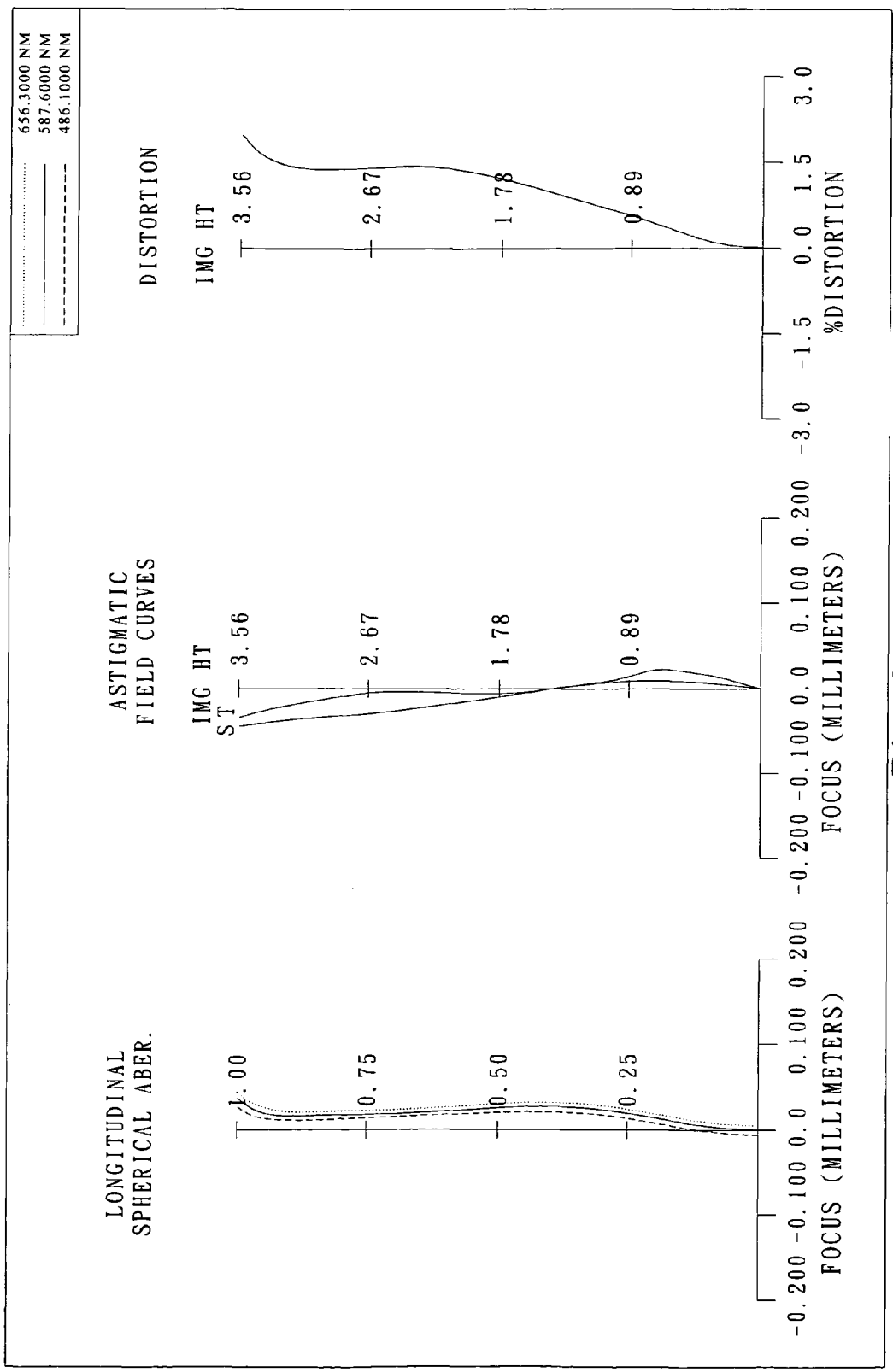
FIG. 6 shows the aberration curves of the third embodiment of the present invention.

FIG. 5 shows an imaging lens assembly in accordance with a third embodiment of the present invention, and FIG. 6 shows the aberration curves of the third embodiment of the present invention. The imaging lens assembly of the third embodiment of the present invention mainly comprises four lens elements, in order from the object side to the image side: a plastic first lens element 510 with negative refractive power having a convex object-side surface 511 and a concave image-side surface 512, the object-side and image-side surfaces 511 and 512 thereof being aspheric; a plastic second lens element 520 with positive refractive power having a convex object-side surface 521 and a convex image-side surface 522, the object-side and image-side surfaces 521 and 522 thereof being aspheric; a plastic third lens element 530 with negative refractive power having a concave object-side surface 531 and a convex image-side surface 532, the object-side and image-side surfaces 531 and 532 thereof being aspheric; and a plastic fourth lens element 540 with positive refractive power having a convex object-side surface 541 on which at least one inflection point is formed and a convex image-side surface 542, the object-side and image-side surfaces 541 and 542 thereof being aspheric; and a stop 500 disposed between the first lens element 510 and the second lens element 520. The imaging lens assembly further comprises a filter 550 and a cover glass 560 disposed between the image-side surface 542 of the fourth lens element 540 and an image plane 570; the filter 550 and the cover glass 560 are made of glass and have no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=6.55 (mm).

In the third embodiment of the present imaging lens assembly, the f-number of the imaging lens assembly is Fno, and it satisfies the relation: Fno=2.80.

In the third embodiment of the present imaging lens assembly, half of the field of view of the imaging lens assembly is HFOV, and it satisfies the relation: HFOV=28.1 (degrees).

In the third embodiment of the present imaging lens assembly, the Abbe number of the second lens element 520 is V2, the Abbe number of the third lens element 530 is V3, and they satisfy the relation: V2−V3=32.5.

In the third embodiment of the present imaging lens assembly, the focal length of the imaging lens assembly is f, the focal length of the first lens element 510 is f1, and they satisfy the relation: f/f1=−0.45.

In the third embodiment of the present imaging lens assembly, the focal length of the imaging lens assembly is f, the focal length of the second lens element 520 is f2, and they satisfy the relation: f/f2=1.67.

In the third embodiment of the present imaging lens assembly, the focal length of the imaging lens assembly is f, the focal length of the third lens element 530 is f3, and they satisfy the relation: f/f3=−1.83.

In the third embodiment of the present imaging lens assembly, the radius of curvature of the object-side surface 511 of the first lens element 510 is R1, the radius of curvature of the image-side surface 512 of the first lens element 510 is R2, and they satisfy the relation: R1/R2=1.53.

In the third embodiment of the present imaging lens assembly, the radius of curvature of the object-side surface 521 of the second lens element 520 is R3, the radius of curvature of the image-side surface 522 of the second lens element 520 is R4, and they satisfy the relation: |R3/R4|=2.54.

In the third embodiment of the present imaging lens assembly, the radius of curvature of the object-side surface 541 of the fourth lens element 540 is R7, the radius of curvature of the image-side surface 542 of the fourth lens element 540 is R8, and they satisfy the relation: |R7/R8|=0.17.

In the third embodiment of the present imaging lens assembly, the distance near the optical axis between the first lens element 510 and the second lens element 520 is T12, the focal length of the imaging lens assembly is f, and they satisfy the relation: T12/f=0.10.

In the third embodiment of the present imaging lens assembly, the vertex of the image-side surface 532 of the third lens element 530 through which the optical axis extends is T, the farthest point of the effective area (the clear aperture radius position) of the image-side surface 532 that allows incoming light to pass through the third lens element 530 is P, the distance near the optical axis between T and P is SAG32, the focal length of the imaging lens assembly is f, and they satisfy the relation: SAG32/f=−0.17.

In the third embodiment of the present imaging lens assembly, the number of the lens elements with refractive power is N, and it satisfies the relation: N=4.

In the third embodiment of the present imaging lens assembly, half of the maximal field of view of the imaging lens assembly is HFOV, the maximum angle at which the chief ray is projected onto the electronic sensor is CRA, and they satisfy the relation: |HFOV/CRA|=2.3.

In the third embodiment of the present imaging lens assembly, the imaging lens assembly further comprises an electronic sensor on which an object is imaged. The distance near the optical axis between the object-side surface 511 of the first lens element 510 and the electronic sensor is TTL, half of the diagonal length of the effective pixel area of the electronic sensor is ImgH, and they satisfy the relation: TTL/ImgH=2.99.

The detailed optical data of the third embodiment is shown in FIG. 15 (TABLE 5), and the aspheric surface data is shown in FIG. 16 (TABLE 6), wherein the units of the radius of curvature, the thickness and the focal length are expressed in mm, HFOV is half of the maximal field of view, and the focal lengths and refractive indexes of the third embodiment are calculated based on a wavelength of 587.6 (nm).

Figure 7:
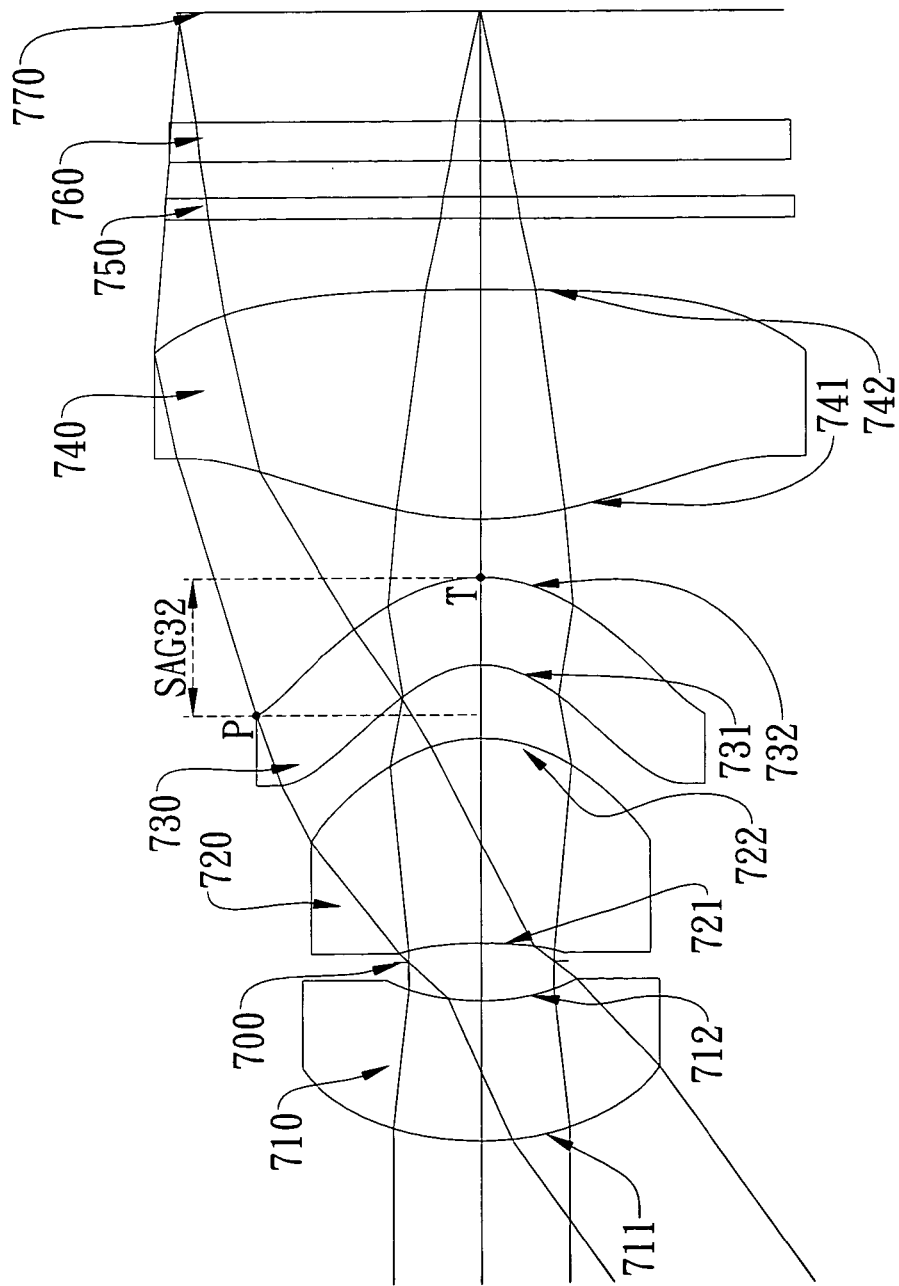
FIG. 7 shows an imaging lens assembly in accordance with a fourth embodiment of the present invention.
Figure 8:
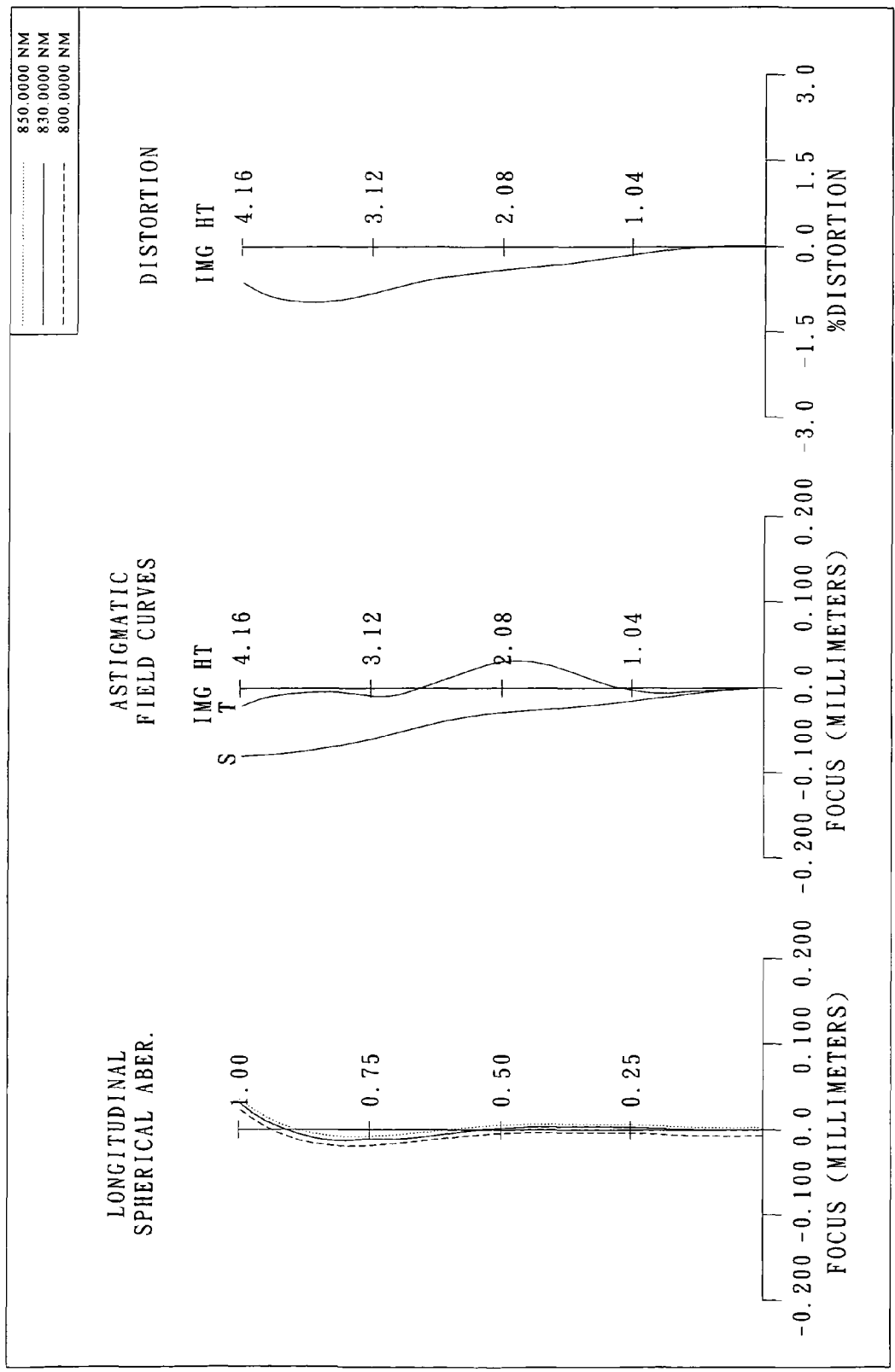
FIG. 8 shows the aberration curves of the fourth embodiment of the present invention.

FIG. 7 shows an imaging lens assembly in accordance with a fourth embodiment of the present invention, and FIG. 8 shows the aberration curves of the fourth embodiment of the present invention. The imaging lens assembly of the fourth embodiment of the present invention mainly comprises four lens elements, in order from the object side to the image side: a plastic first lens element 710 with negative refractive power having a convex object-side surface 711 and a concave image-side surface 712, the object-side and image-side surfaces 711 and 712 thereof being aspheric; a plastic second lens element 720 with positive refractive power having a concave object-side surface 721 and a convex image-side surface 722, the object-side and image-side surfaces 721 and 722 thereof being aspheric; a plastic third lens element 730 with negative refractive power having a concave object-side surface 731 and a convex image-side surface 732, the object-side and image-side surfaces 731 and 732 thereof being aspheric; and a plastic fourth lens element 740 with positive refractive power having a convex object-side surface 741 on which at least one inflection point is formed and a convex image-side surface 742, the object-side and image-side surfaces 741 and 742 thereof being aspheric; and a stop 700 disposed between the first lens element 710 and the second lens element 720. The imaging lens assembly further comprises a filter 750 and a cover glass 760 disposed between the image-side surface 742 of the fourth lens element 740 and an image plane 770; the filter 750 and the cover glass 760 are made of glass and have no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=5.95 (mm).

In the fourth embodiment of the present imaging lens assembly, the f-number of the imaging lens assembly is Fno, and it satisfies the relation: Fno=2.45.

In the fourth embodiment of the present imaging lens assembly, half of the field of view of the imaging lens assembly is HFOV, and it satisfies the relation: HFOV=35.2 (degrees).

In the fourth embodiment of the present imaging lens assembly, the Abbe number of the second lens element 720 is V2, the Abbe number of the third lens element 730 is V3, and they satisfy the relation: V2−V3=26.6.

In the fourth embodiment of the present imaging lens assembly, the focal length of the Imaging lens assembly is f, the focal length of the first lens element 710 is f1, and they satisfy the relation: f/f1=−0.05.

In the fourth embodiment of the present imaging lens assembly, the focal length of the imaging lens assembly is f, the focal length of the second lens element 720 is f2, and they satisfy the relation: f/f2=1.20.

In the fourth embodiment of the present imaging lens assembly, the focal length of the imaging lens assembly is f, the focal length of the third lens element 730 is f3, and they satisfy the relation: f/f3=−0.52.

In the fourth embodiment of the present imaging lens assembly, the radius of curvature of the object-side surface 711 of the first lens element 710 is R1, the radius of curvature of the image-side surface 712 of the first lens element 710 is R2, and they satisfy the relation: R1/R2=1.27.

In the fourth embodiment of the present imaging lens assembly, the radius of curvature of the object-side surface 721 of the second lens element 720 is R3, the radius of curvature of the image-side surface 722 of the second lens element 720 is R4, and they satisfy the relation: |R3/R4|=2.94.

In the fourth embodiment of the present imaging lens assembly, the radius of curvature of the object-side surface 741 of the fourth lens element 740 is R7, the radius of curvature of the image-side surface 742 of the fourth lens element 740 is R8, and they satisfy the relation: |R7/R8|=0.05.

In the fourth embodiment of the present imaging lens assembly, the distance near the optical axis between the first lens element 710 and the second lens element 720 is T12, the focal length of the imaging lens assembly is f, and they satisfy the relation: T12/f=0.13.

In the fourth embodiment of the present imaging lens assembly, the vertex of the image-side surface 732 of the third lens element 730 through which the optical axis extends is T, the farthest point of the effective area (the clear aperture radius position) of the image-side surface 732 that allows incoming light to pass through the third lens element 730 is P,
the distance near the optical axis between T and P is SAG32, the focal length of the imaging lens assembly is f, and they satisfy the relation: SAG32/f=−0.32.

In the fourth embodiment of the present imaging lens assembly, the number of the lens elements with refractive power is N, and it satisfies the relation: N=4.

In the fourth embodiment of the present imaging lens assembly, half of the maximal field of view of the imaging lens assembly is HFOV, the maximum angle at which the chief ray is projected onto the electronic sensor is CRA, and they satisfy the relation: |HFOV/CRA|=17.4.

In the fourth embodiment of the present imaging lens assembly, the imaging lens assembly further comprises an electronic sensor on which an object is imaged. The distance near the optical axis between the object-side surface 711 of the first lens element 710 and the electronic sensor is TTL, half of the diagonal length of the effective pixel area of the electronic sensor is ImgH, and they satisfy the relation: TTL/ImgH=3.72.

The detailed optical data of the fourth embodiment is shown in FIG. 17 (TABLE 7), and the aspheric surface data is shown in FIG. 18 (TABLE 8), wherein the units of the radius of curvature, the thickness and the focal length are expressed in mm, HFOV is half of the maximal field of view, and the focal lengths and refractive indexes of the fourth embodiment are calculated based on a wavelength of 830.0 (nm).

Figure 9:
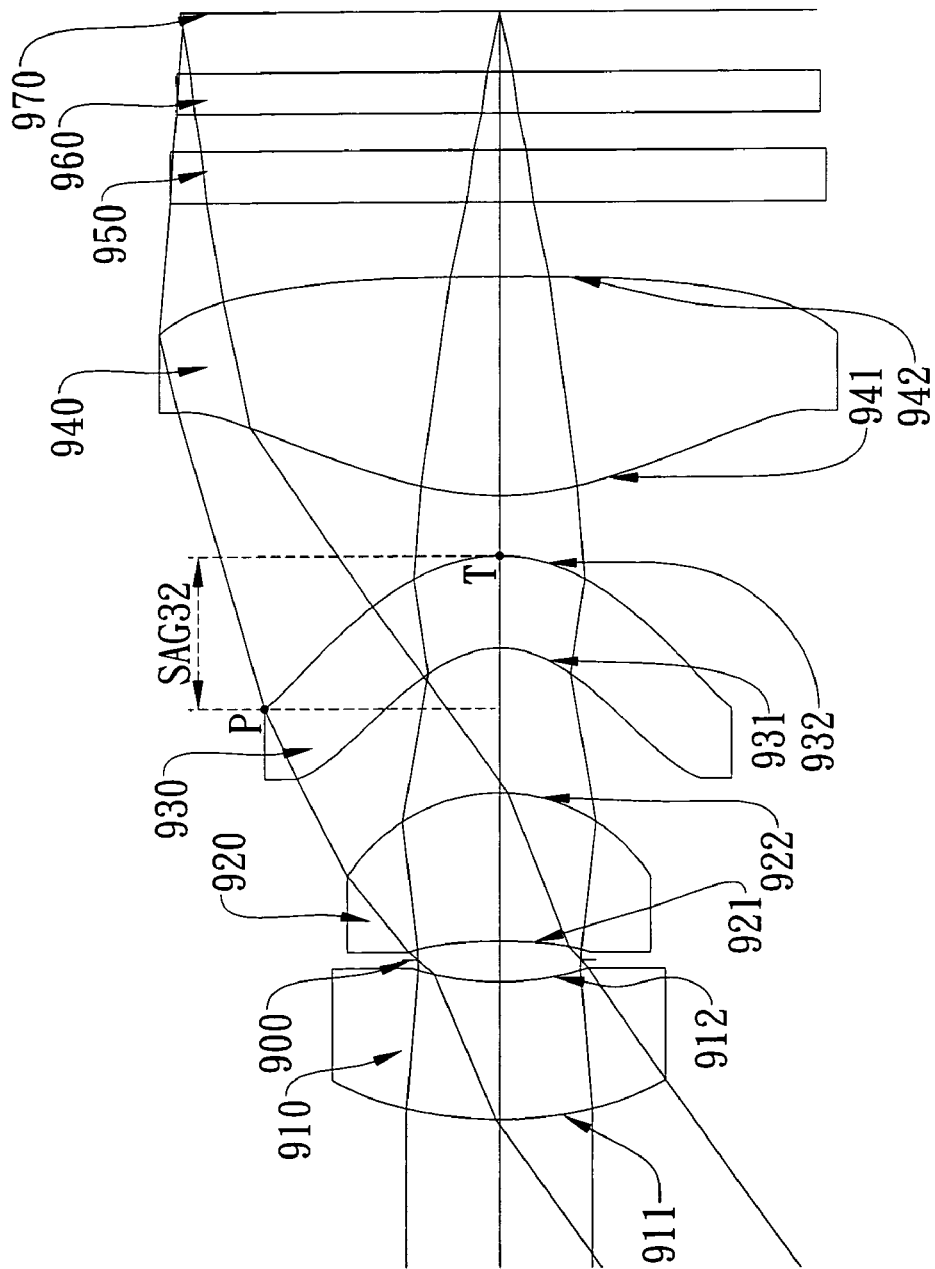
FIG. 9 shows an imaging lens assembly in accordance with a fifth embodiment of the present invention.
Figure 10:
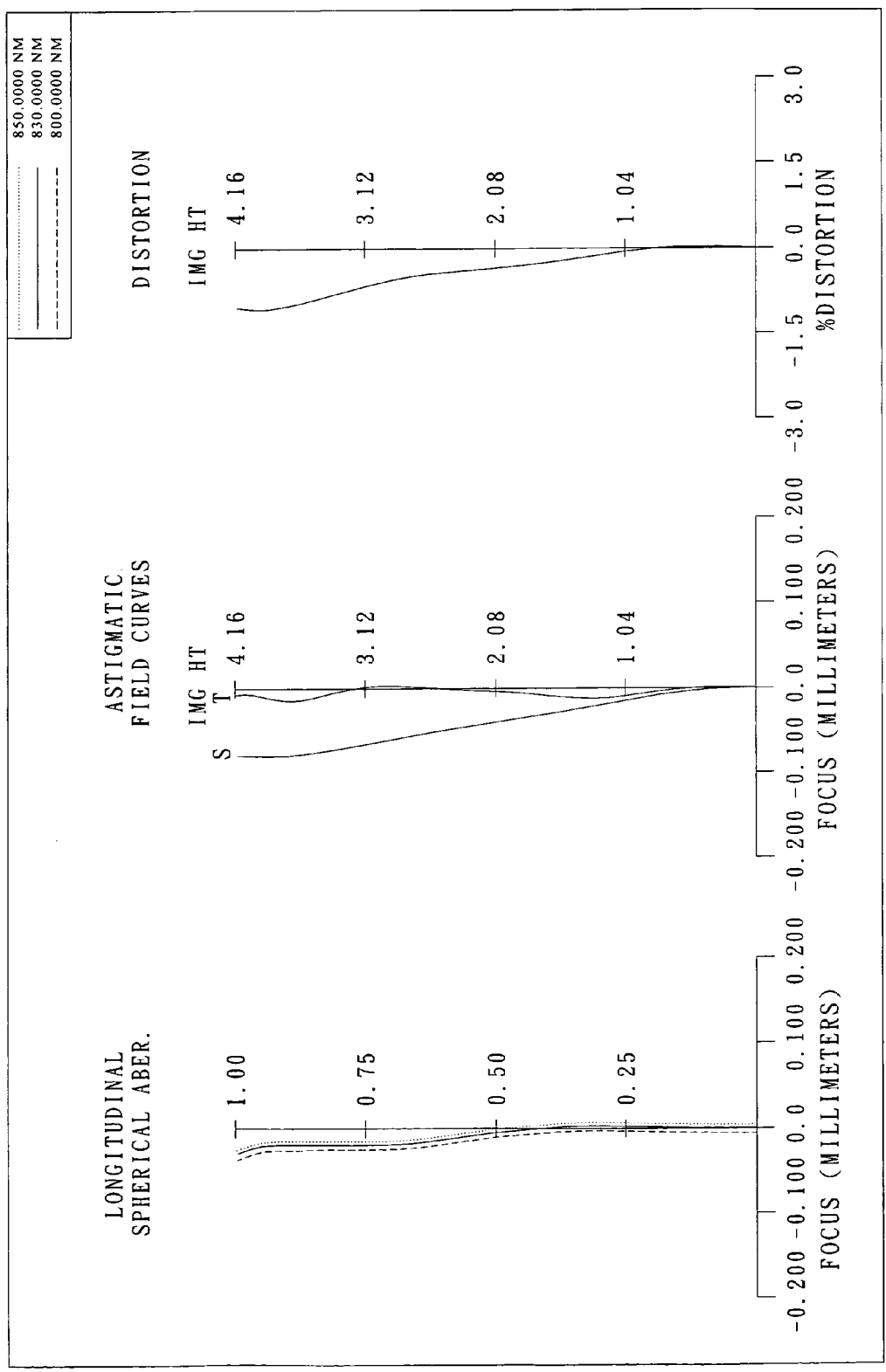
FIG. 10 shows the aberration curves of the fifth embodiment of the present invention.

FIG. 9 shows an imaging lens assembly in accordance with a fifth embodiment of the present invention, and FIG. 10 shows the aberration curves of the fifth embodiment of the present invention. The imaging lens assembly of the fifth embodiment of the present invention mainly comprises four lens elements, in order from the object side to the image side: a plastic first lens element 910 with negative refractive power having a convex object-side surface 911 and a concave image-side surface 912, the object-side and image-side surfaces 911 and 912 thereof being aspheric; a plastic second lens element 920 with positive refractive power having a concave object-side surface 921 and a convex image-side surface 922, the object-side and image-side surfaces 921 and 922 thereof being aspheric; a plastic third lens element 930 with negative refractive power having a concave object-side surface 931 and a convex image-side surface 932, the object-side and image-side surfaces 931 and 932 thereof being aspheric; and a plastic fourth lens element 940 with positive refractive power having a convex object-side surface 941 on which at least one inflection point is formed and a convex image-side surface 942, the object-side and image-side surfaces 941 and 942 thereof being aspheric; and a stop 900 disposed between the first lens element 910 and the second lens element 920. The imaging lens assembly further comprises a filter 950 and a cover glass 960 disposed between the image-side surface 942 of the fourth lens element 940 and an image plane 970; the filter 950 and the cover glass 960 are made of glass and have no influence on the focal length of the imaging lens assembly.

The equation of the aspheric surface profiles of the fifth embodiment has the same form as that of the first embodiment.

In the fifth embodiment of the present imaging lens assembly, the focal length of the imaging lens assembly is f, and it satisfies the relation: f=5.97 (mm).

In the fifth embodiment of the present imaging lens assembly, the f-number of the imaging lens assembly is Fno, and it satisfies the relation: Fno=2.45.

In the fifth embodiment of the present imaging lens assembly, half of the field of view of the imaging lens assembly is HFOV, and it satisfies the relation: HFOV=35.2 (degrees).

In the fifth embodiment of the present imaging lens assembly, the Abbe number of the second lens element 920 is V2, the Abbe number of the third lens element 930 is V3, and they satisfy the relation: V2−V3=26.6.

In the fifth embodiment of the present imaging lens assembly, the focal length of the imaging lens assembly is f, the focal length of the first lens element 910 is f1, and they satisfy the relation: f/f1=−0.13.

In the fifth embodiment of the present imaging lens assembly, the focal length of the imaging lens assembly is f, the focal length of the second lens element 920 is f2, and they satisfy the relation: f/f2=1.07.

In the fifth embodiment of the present imaging lens assembly, the focal length of the imaging lens assembly is f, the focal length of the third lens element 930 is f3, and they satisfy the relation: f/f3=−0.52.

In the fifth embodiment of the present imaging lens assembly, the radius of curvature of the object-side surface 911 of the first lens element 910 is R1, the radius of curvature of the image-side surface 912 of the first lens element 910 is R2, and they satisfy the relation: R1/R2=1.39.

In the fifth embodiment of the present imaging lens assembly, the radius of curvature of the object-side surface 921 of the second lens element 920 is R3, the radius of curvature of the image-side surface 922 of the second lens element 920 is R4, and they satisfy the relation: |R3/R4|=3.22.

In the fifth embodiment of the present imaging lens assembly, the radius of curvature of the object-side surface 941 of the fourth lens element 940 is R7, the radius of curvature of the image-side surface 942 of the fourth lens element 940 is R8, and they satisfy the relation: |R7/R8|=0.04.

In the fifth embodiment of the present imaging lens assembly, the distance near the optical axis between the first lens element 910 and the second lens element 920 is T12, the focal length of the imaging lens assembly is f, and they satisfy the relation: T12/f=0.09.

In the fifth embodiment of the present imaging lens assembly, the vertex of the image-side surface 932 of the third lens element 930 through which the optical axis extends is T, the farthest point of the effective area (the clear aperture radius position) of the image-side surface 932 that allows incoming light to pass through the third lens element 930 is P, the distance near the optical axis between T and P is SAG32, the focal length of the imaging lens assembly is f, and they satisfy the relation: SAG32/f=−0.35.

In the fifth embodiment of the present imaging lens assembly, the number of the lens elements with refractive power is N, and it satisfies the relation: N=4.

In the fifth embodiment of the present imaging lens assembly, half of the maximal field of view of the imaging lens assembly is HFOV, the maximum angle at which the chief ray is projected onto the electronic sensor is CRA, and they satisfy the relation: |HFOV/CRA|=15.3.

In the fifth embodiment of the present imaging lens assembly, the imaging lens assembly further comprises an electronic sensor on which an object is imaged. The distance near the optical axis between the object-side surface 911 of the first lens element 910 and the electronic sensor is TTL, half of the diagonal length of the effective pixel area of the electronic sensor is ImgH, and they satisfy the relation: TTL/ImgH=3.48.

The detailed optical data of the fifth embodiment is shown in FIG. 19 (TABLE 9), and the aspheric surface data is shown in FIG. 20 (TABLE 10), wherein the units of the radius of curvature, the thickness and the focal length are expressed in mm, HFOV is half of the maximal field of view, and the focal lengths and refractive indexes of the fifth embodiment are calculated based on a wavelength of 830.0 (nm).

It is to be noted that TABLES 1-10 (illustrated in FIGS. 11-20 respectively) show different data of the different embodiments, however, the data of the different embodiments are obtained from experiments. Therefore, any imaging lens assembly of the same structure is considered to be within the scope of the present invention even if it uses different data. The embodiments depicted above and the appended drawings are exemplary and are not intended to limit the claim scope of the present invention. TABLE 11 (illustrated in FIG. 21) shows the data of the respective embodiments resulting from the equations.

What is claimed is:

1. An imaging lens assembly comprising, in order from an object side to an image side:
   a first lens element with negative refractive power having a convex object-side surface and a concave image-side surface;
   a second lens element with positive refractive power having a convex image-side surface;
   a third lens element with negative refractive power having a concave object-side surface and a convex image-side surface, both surfaces being aspheric;
   a fourth lens element with positive refractive power having a convex object-side surface, the object-side and image-side surfaces thereof being aspheric; and
   a stop disposed between the first lens element and the second lens element; wherein a distance near the optical axis between the first lens element and the second lens element is T12, a focal length of the imaging lens assembly is f, a focal length of the second lens element is f2, the number of the lens elements with refractive power is N, and they satisfy the relations: 0.00<T12/f<2.50, 0.60<f/f2<1.72, 4≦N≦6.

2. The imaging lens assembly according to claim 1, wherein the first lens element has at least one aspheric surface, and wherein the fourth lens element has a concave image-side surface with at least one inflection point.

3. The imaging lens assembly according to claim 1, wherein the number of the lens elements with refractive power is N, and it satisfies the relation: N=4.

4. The imaging lens assembly according to claim 3, wherein the second lens element has a concave object-side surface.

5. The imaging lens assembly according to claim 3, wherein the focal length of the imaging lens assembly is f, the focal length of the second lens element is f2, and they satisfy the relation: 0.85<f/f2<1.40.

6. The imaging lens assembly according to claim 3, wherein an Abbe number of the second lens element is V2, an Abbe number of the third lens element is V3, and they satisfy the relation: 20<V2−V3<40.

7. The imaging lens assembly according to claim 3, wherein the focal length of the imaging lens assembly is f, a focal length of the first lens element is f1, and they satisfy the relation: −0.50<f/f1<−0.10.

8. The imaging lens assembly according to claim 3, wherein the distance near the optical axis between the first lens element and the second lens element is T12, the focal length of the imaging lens assembly is f, and they satisfy the relation: 0.00<T12/f<0.60.

9. The imaging lens assembly according to claim 8, wherein the distance near the optical axis between the first lens element and the second lens element is T12, the focal length of the imaging lens assembly is f, and they satisfy the relation: 0.00<T12/f<0.25.

10. The imaging lens assembly according to claim 4, wherein a radius of curvature of the object-side surface of the first lens element is R1, a radius of curvature of the image-side surface of the first lens element is R2, and they satisfy the relation: 1.00<R1/R2<2.30.

11. The imaging lens assembly according to claim 4, wherein a vertex of the image-side surface of the third lens element near the optical axis is T, a farthest point of the effective light entry area on the image-side surface of the third lens element is P, an distance near the optical axis between T and P is SAG32, the focal length of the imaging lens assembly is f, and they satisfy the relation: −0.50<SAG32/f<−0.25.

12. The imaging lens assembly according to claim 3, wherein a radius of curvature of the object-side surface of the second lens element is R3, a radius of curvature of the image-side surface of the second lens element is R4, and they satisfy the relation: 1.65<|R3/R4|.

13. The imaging lens assembly according to claim 3, wherein a radius of curvature of the object-side surface of the fourth lens element is R7, a radius of curvature of the image-side surface of the fourth lens element is R8, and they satisfy the relation: |R7/R8|<0.35.

14. The imaging lens assembly according to claim 3 further comprising an electronic sensor on which an object is imaged, wherein half of the maximal field of view of the imaging lens assembly is HFOV, a maximum angle at which the chief ray is projected onto the electronic sensor is CRA, and they satisfy the relation: 5.0<|HFOV/CRA|.

15. The imaging lens assembly according to claim 1 further comprising an electronic sensor on which an object is imaged, wherein an distance near the optical axis between the object-side surface of the first lens element and the electronic sensor is TTL, half of the diagonal length of the effective pixel area of the electronic sensor is ImgH, and they satisfy the relation: TTL/ImgH<4.0.

16. An imaging lens assembly comprising, in order from an object side to an image side:
a first lens element with negative refractive power having a convex object-side surface and a concave image-side surface;
a second lens element with positive refractive power having a concave object-side surface and a convex image-side surface;
a third lens element with negative refractive power having a concave object-side surface and a convex image-side surface, at least one being aspheric;
a fourth lens element with positive refractive power having a convex object-side surface, and at least one aspheric surface; and
a stop disposed between the first lens element and the second lens element; wherein there are only four lens elements with refractive power.

17. The imaging lens assembly according to claim 16, wherein a focal length of the imaging lens assembly is f, a focal length of the second lens element is f2, and they satisfy the relation: 0.60<f/f2<1.72.

18. The imaging lens assembly according to claim 17, wherein the focal length of the imaging lens assembly is f, the focal length of the second lens element is f2, and they satisfy the relation: 0.85<f/f2<1.40.

19. The imaging lens assembly according to claim 16, wherein a distance near the optical axis between the first lens element and the second lens element is T12, the focal length of the imaging lens assembly is f, and they satisfy the relation: 0.00<T12/f<0.25.

20. The imaging lens assembly according to claim 16, wherein the focal length of the imaging lens assembly is f, a focal length of the third lens element is f3, and they satisfy the relation: −0.80<f/f3<−0.15.

21. The imaging lens assembly according to claim 18, wherein a radius of curvature of the object-side surface of the second lens element is R3, a radius of curvature of the image-side surface of the second lens element is R4, and they satisfy the relation: 2.00<|R3/R4|.

22. An imaging lens assembly comprising, in order from an object side and an image side:
a first lens element with negative refractive power having a convex object-side surface and a concave image-side surface;
a second lens element with positive refractive power having a convex image-side surface;
a third lens element with negative refractive power having a concave object-side surface and a convex image-side surface, at least one being aspheric;
a fourth lens element with positive refractive power having a convex object-side surface and a convex image-side surface, at least one being aspheric; and
a stop disposed between the first lens element and the second lens element; wherein there are only four lens elements with refractive power.

23. The imaging lens assembly according to claim 22, wherein a focal length of the imaging lens assembly is f, a focal length of the second lens element is f2, and they satisfy the relation: 0.60<f/f2<1.72.

24. The imaging lens assembly according to claim 22, wherein a distance near the optical axis between the first lens element and the second lens element is T12, the focal length of the imaging lens assembly is f, and they satisfy the relation: 0.0<T12/f<0.25.

25. The imaging lens assembly according to claim 22, wherein a radius of curvature of the object-side surface of the fourth lens element is R7, a radius of curvature of the image-side surface of the fourth lens element is R8, and they satisfy the relation: |R7/R8|<0.35.

* * * * *